(12) United States Patent
Kinoshita et al.

(10) Patent No.: US 11,579,661 B2
(45) Date of Patent: Feb. 14, 2023

(54) PORTABLE INFORMATION DEVICE AND HINGE DEVICE

(71) Applicant: Lenovo (Singapore) Pte. Ltd., Singapore (SG)

(72) Inventors: Hiroaki Kinoshita, Kanagawa (JP); Tetsuya Sano, Kanagawa (JP); Tatsuya Ushioda, Kanagawa (JP); Yuta Tsuganezawa, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 68 days.

(21) Appl. No.: 17/175,791

(22) Filed: Feb. 15, 2021

(65) Prior Publication Data
US 2022/0113769 A1    Apr. 14, 2022

(30) Foreign Application Priority Data

Oct. 12, 2020 (JP) .............................. JP2020-172080

(51) Int. Cl.
  *G06F 1/16* (2006.01)
  *E05D 3/16* (2006.01)
  *E05D 11/08* (2006.01)
(52) U.S. Cl.
  CPC ............. *G06F 1/1681* (2013.01); *E05D 3/16* (2013.01); *E05D 11/082* (2013.01); *E05Y 2201/236* (2013.01); *E05Y 2900/606* (2013.01)
(58) Field of Classification Search
  CPC ....... G06F 1/1681; E05D 3/16; E05D 11/082; E05Y 2201/236; E05Y 2900/606
  See application file for complete search history.

(56) References Cited

U.S. PATENT DOCUMENTS

| 9,677,308 | B1* | 6/2017 | Chen ......................... E05D 3/06 |
| 9,870,031 | B2* | 1/2018 | Hsu ........................ G06F 1/1681 |
| 10,101,776 | B2* | 10/2018 | Huang .................. G06F 1/1681 |
| 10,401,917 | B1* | 9/2019 | Dai ........................ G06F 1/1681 |
| 10,429,896 | B2* | 10/2019 | Kuramochi ........... G06F 1/1681 |
| 10,480,225 | B1* | 11/2019 | Hsu ............................ E05D 3/12 |
| 10,802,551 | B1* | 10/2020 | Lin ........................ G06F 1/1652 |
| 10,975,603 | B2* | 4/2021 | Tazbaz ...................... E05D 7/00 |
| 11,009,061 | B2* | 5/2021 | Chang .................... E05D 11/06 |
| 11,016,530 | B2* | 5/2021 | Watamura ............ G06F 1/1652 |
| 11,334,122 | B2* | 5/2022 | Hsu ......................... F16C 11/04 |

(Continued)

FOREIGN PATENT DOCUMENTS

JP          6507183 B2    4/2019

*Primary Examiner* — Victor D Batson
*Assistant Examiner* — Matthew J Sullivan
(74) *Attorney, Agent, or Firm* — Osha Bergman Watanabe & Burton LLP

(57) ABSTRACT

A portable information device includes: a first chassis, a second chassis adjacent to the first chassis, and a hinge device that relatively rotatably connects the first chassis and the second chassis. The hinge device includes: a first torque generating part that generates a rotation torque in relative rotation of a first base plate and a first link plate by sliding resistance between the first base plate and the first link plate, and a second torque generating part that generates a rotation torque in relative rotation of a second base plate and a second link plate by sliding resistance between the second base plate and the second link plate.

8 Claims, 11 Drawing Sheets

(56) References Cited

U.S. PATENT DOCUMENTS

| | | | | |
|---|---|---|---|---|
| 2014/0217875 A1* | 8/2014 | Park | .................. | G06F 1/1681 |
| | | | | 16/354 |
| 2016/0041589 A1* | 2/2016 | Tazbaz | ................ | H04M 1/022 |
| | | | | 361/679.06 |
| 2016/0090763 A1* | 3/2016 | Hsu | .................. | G06F 1/1681 |
| | | | | 16/354 |
| 2016/0370828 A1* | 12/2016 | Hsu | .................. | G06F 1/1652 |
| 2019/0250675 A1* | 8/2019 | Lin | .................. | G06F 1/1681 |
| 2021/0011522 A1* | 1/2021 | Watamura | .......... | E05D 11/0054 |
| 2021/0037664 A1* | 2/2021 | Sun | .................. | G06F 1/1615 |
| 2021/0207648 A1* | 7/2021 | Chen | ................ | H04M 1/022 |
| 2021/0216103 A1* | 7/2021 | Chen | ................ | G06F 1/1681 |
| 2021/0365076 A1* | 11/2021 | Shibayama | .......... | G06F 1/1652 |
| 2022/0121245 A1* | 4/2022 | Huang | ................ | G06F 1/1652 |
| 2022/0121248 A1* | 4/2022 | Lee | .................. | G06F 1/1652 |
| 2022/0162892 A1* | 5/2022 | Mitsui | .............. | E05D 3/18 |

* cited by examiner

PORTABLE INFORMATION DEVICE AND HINGE DEVICE

FIELD OF THE INVENTION

The present invention relates to a portable information device in which two chassis are relatively rotatably connected, and a hinge device used in the portable information device.

BACKGROUND

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, the present applicant has proposed a portable information device in which not only a chassis but also a display is configured so as to be foldable by the use of a flexible display, such as organic EL (Electro Luminescence) (for example, refer to Japanese Patent No. 6,507,183).

The portable information device as described above can be used in multiple modes according to a rotation angle between right and left chassis. For example, when the rotation angle between the chassis is set about between 120 degrees and 140 degrees, the portable information device can be used like a typical laptop PC. In addition, when the rotation angle between the right and left chassis is set to, for example, 180 degrees, the portable information device can be used like a typical tablet PC. A hinge device used in this type of portable information device needs to be able to generate an optimal rotation torque according to the rotation angle between the chassis and improve the stability and handleability of the chassis in each mode.

SUMMARY

One or more embodiments of the present invention provide a portable information device including a hinge device capable of improving the stability when using two chassis in multiple modes according to the rotation angle between them, and the hinge device used in the portable information device.

A portable information device according to the first aspect of the present invention includes a first chassis; a second chassis adjacent to the first chassis; a hinge device configured to relatively rotatably connect the first chassis and the second chassis, while gradually changing an angle at which their plane directions intersect each other between a 0-degree position in which the first chassis and the second chassis are stacked to overlap with each other in their plane directions and a 180-degree position in which the first chassis and the second chassis are arranged each other in a direction perpendicular to their plane directions; in which the hinge device comprises: a first base plate fixed to the first chassis; a second base plate fixed to the second chassis; a first link plate disposed to overlap with the first base plate and having a first end portion relatively rotatably connected to the first base plate through a first shaft; a second link plate disposed to overlap with the second base plate and having a first end portion relatively rotatably connected to the second base plate through a second shaft; a coupling plate having a first end portion relatively rotatably connected to a second end portion of the first link plate through a third shaft and a second end portion relatively rotatably connected to a second end portion of the second link plate through a fourth shaft; a first torque generating part configured to generate a rotation torque in relative rotation of the first base plate and the first link plate by sliding resistance between the first base plate and the first link plate; and a second torque generating part configured to generate a rotation torque in relative rotation of the second base plate and the second link plate by sliding resistance between the second base plate and the second link plate, assuming that when the rotation angle between the first chassis and the second chassis is between the 0-degree position and a 20-degree position, torques to be generated by the first torque generating part and the second torque generating part are each referred to as a first torque, when the rotation angle between the first chassis and the second chassis is between a 120-degree position and a 140-degree position, torques to be generated by the first torque generating part and the second torque generating part are each referred to as a second torque, and when the rotation angle between the first chassis and the second chassis is the 180-degree position, torques to be generated by the first torque generating part and the second torque generating part are each referred to as a third torque, the second torque is greater than the first torque, and the third torque is greater than the second torque.

A portable information device according to the second aspect of the present invention includes: a first chassis; a second chassis adjacent to the first chassis; and a hinge device configured to relatively rotatably connect the first chassis and the second chassis, while gradually changing an angle at which their plane directions intersect each other between a 0-degree position in which the first chassis and the second chassis are stacked to overlap with each other in their plane directions and a 180-degree position in which the first chassis and the second chassis are arranged each other in a direction perpendicular to their plane directions, in which the hinge device has a torque generating part configured to generate a rotation torque in rotation operation between the first chassis and the second chassis, and assuming that when the rotation angle between the first chassis and the second chassis is between the 0-degree position and a 20-degree position, a torque to be generated by the torque generating part is referred to as a first torque, when the rotation angle between the first chassis and the second chassis is between a 120-degree position and a 140-degree position, a torque to be generated by the torque generating part is referred to as a second torque, and when the rotation angle between the first chassis and the second chassis is the 180-degree position, a torque to be generated by the torque generating part is referred to as a third torque, the second torque is greater than the first torque, and the third torque is greater than the second torque.

A hinge device according to the third aspect of the present invention is a hinge device for relatively rotatably connecting a first chassis and a second chassis of a portable information device, in which the hinge device is to relatively rotatably connect the first chassis and the second chassis, while gradually changing an angle at which their plane directions intersect each other between a 0-degree position in which the first chassis and the second chassis are stacked to overlap with each other in their plane directions and a 180-degree position in which the first chassis and the second chassis are arranged each other in a direction perpendicular to their plane directions, the hinge device includes: a first base plate fixed to the first chassis; a second base plate fixed to the second chassis; a first link plate disposed to overlap with the first base plate and having a first end portion relatively rotatably connected to the first base plate through a first shaft; a second link plate disposed to overlap with the second base plate and having a first end portion relatively rotatably connected to the second base plate through a second shaft; a coupling plate having a first end portion relatively rotatably connected to a second end portion of the first link plate through a third shaft and a second end portion relatively rotatably connected to a second end portion of the second link plate through a fourth shaft; a first torque generating part configured to generate a rotation torque in relative rotation of the first base plate and the first link plate by sliding resistance between the first base plate and the first link plate; and a second torque generating part configured to generate a rotation torque in relative rotation of the second base plate and the second link plate by sliding resistance between the second base plate and the second link plate, assuming that torques to be generated by the first torque generating part and the second torque generating part, when the rotation angle between the first chassis and the second chassis is set between the 0-degree position and a 20-degree position, are each referred to as a first torque, torques to be generated by the first torque generating part and the second torque generating part, when the rotation angle between the first chassis and the second chassis is set between a 120-degree position and a 140-degree position, are each referred to as a second torque, and torques to be generated by the first torque generating part and the second torque generating part, when the rotation angle between the first chassis and the second chassis is set to the 180-degree position, are each referred to as a third torque, the second torque is greater than the first torque, and the third torque is greater than the second torque.

According to the above-described aspects of the present invention, it is possible to improve the stability when using two chassis in multiple modes according to the rotation angle between them.

DETAILED DESCRIPTION

Hereinafter, a preferable embodiment of a portable information device and a hinge device according to the present invention is described in detail with reference to the attached drawings.

Figure 1:
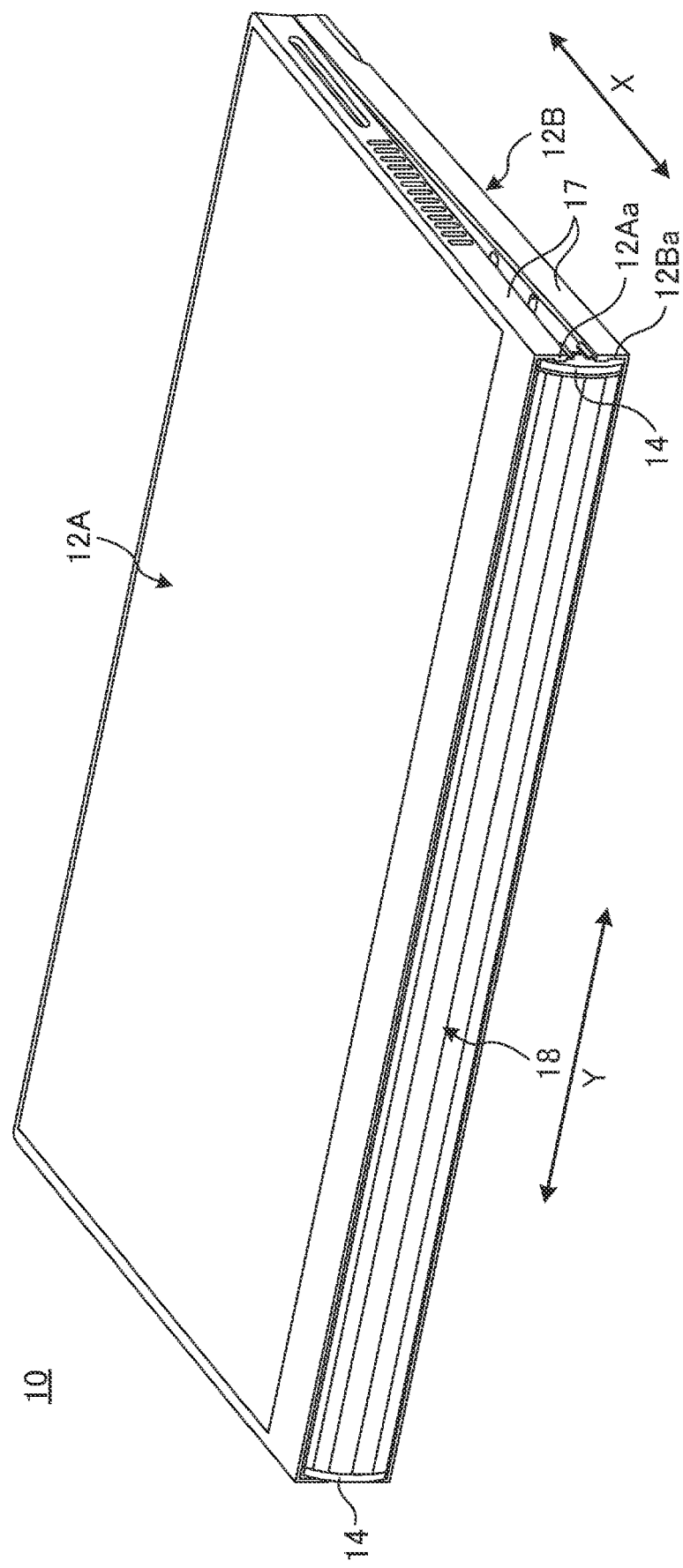
FIG. 1 is a perspective view illustrating a state where a portable information device according to one embodiment is closed into a storage form.
Figure 2:
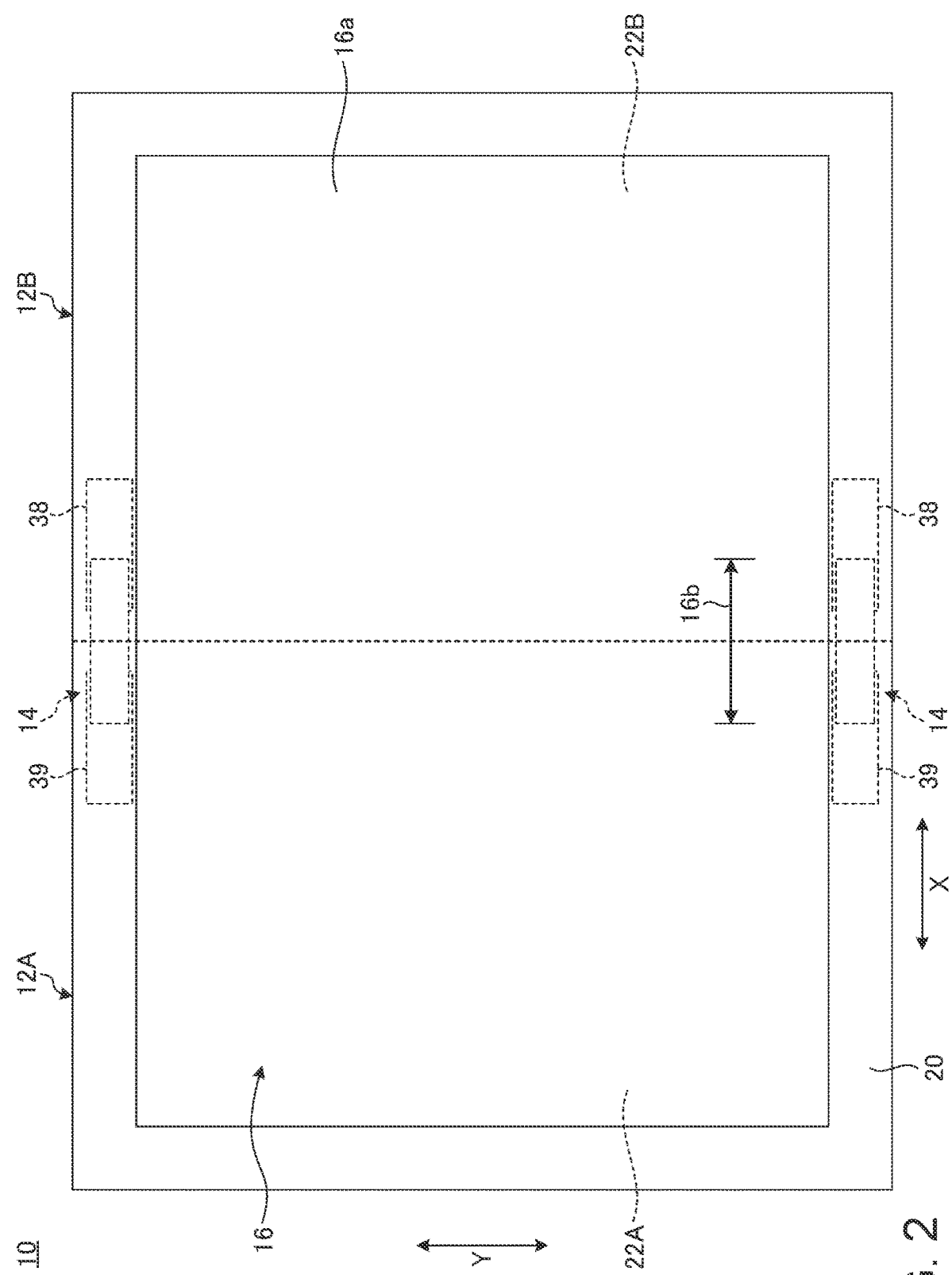
FIG. 2 is a plan view schematically illustrating a state where the portable information device illustrated in FIG. 1 is opened into a usage form.
Figure 3:
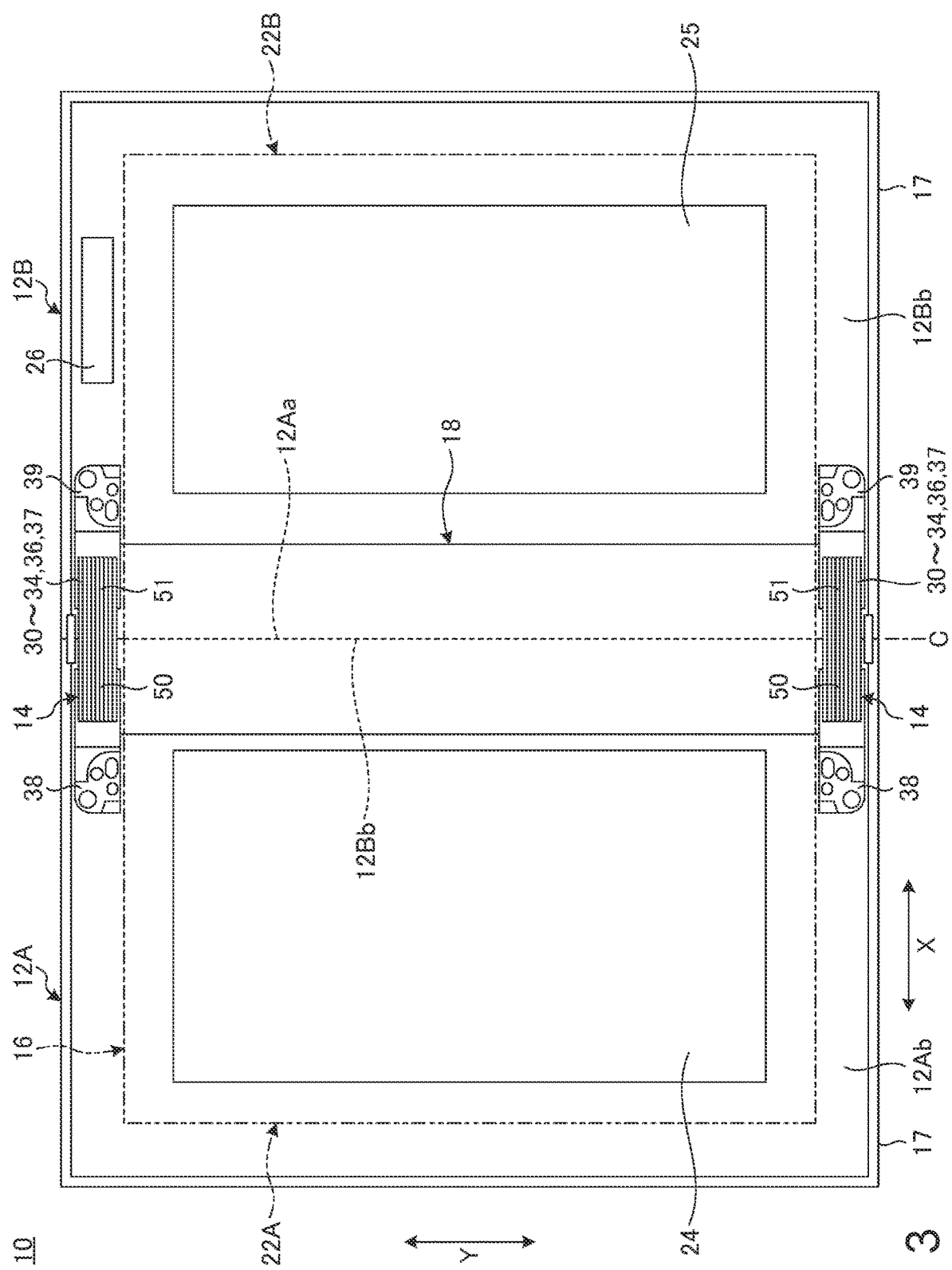
FIG. 3 is a plan view schematically illustrating the internal structure of the portable information device illustrated in FIG. 2.

FIG. 1 is a perspective view illustrating a state where a portable information device 10 according to one embodiment is closed into a 0-degree position. FIG. 2 is a plan view schematically illustrating a state where the portable information device 10 illustrated in FIG. 1 is opened into a 180-degree position. FIG. 3 is a plan view schematically illustrating the internal structure of the portable information device 10 illustrated in FIG. 2.

As illustrated in FIG. 1 to FIG. 3, the portable information device 10 includes a first chassis 12A, a second chassis 12B, a hinge device 14, and a display 16. The portable information device 10 according to the present embodiment is a laptop PC or a tablet PC foldable like a book. The portable information device 10 may be a cellular phone, a smartphone, an electronic notebook, or a portable game console, etc.

The chassis 12A and 12B are each rectangular flat box body in which side plates 17 are formed so as to be raised on four peripheries of the bottom plate (refer to FIG. 3) and the display 16 is disposed on an opened top surface. The chassis 12A and 12B are each composed of metal plates of stainless steel, magnesium, and aluminum etc., fiber reinforced resin plates containing reinforced fibers, such as carbon fibers, or the like, for example.

The chassis 12A and 12B are disposed adjacent to each other. The chassis 12A and 12B are connected through a pair of hinge devices 14 and 14 provided in both end portions in the Y direction of one edge portions 12Aa and 12Ba as edge portions adjacent to each other. The hinge devices 14 rotatably connect the one edge portions 12Aa and 12Ba of the first chassis 12A and the second chassis 12B so that the second chassis 12B is opened and closed with respect to the first chassis 12A. The chassis 12A and 12B are rotatably connected by the hinge devices 14. The chassis 12A and 12B can be moved to a desired angular position between the 0-degree position illustrated in FIG. 1 and the 180-degree position illustrated in FIG. 2. A line C illustrated by the dashed-dotted line in FIG. 3 represents a bending center C serving as the center of a folding operation of the chassis 12A and 12B. In the 0-degree position illustrated in FIG. 1, the one edge portions 12Aa and 12Ba of the chassis 12A and 12B are greatly separated from each other. Then, a boundary portion between the one edge portions 12Aa and 12Ba is covered by a backbone member 18.

Hereinafter, as illustrated in FIG. 1 to FIG. 3, the portable information device 10 is described referring a direction in which the chassis 12A and 12B are arranged as an X direction and a direction perpendicular to the X direction as a Y direction. In addition, for a rotation angle position between the chassis 12A and 12B by the hinge device 14, for convenience of explanation, a position in which the first chassis and the second chassis are stacked to overlap with each other in their plane directions, is referred to as a 0-degree position. Then, from the 0-degree position, change in position when the chassis 12A and 12B opens while gradually changing an angle at which their plane directions intersect each other, is described at each angle. For example, a position in which their plane directions of the chassis 12A and 12B perpendicularly intersect each other, is referred to as a 90-degree position. For example, a position in which the chassis 12A and 12B are arranged each other in a direction perpendicular to their plane directions, is referred to as a 180-degree position. It is to be noted that the terms "0-degree position," "90-degree position," "180-degree position" and the like may obviously include an angle position that is a little bit shifted from the accurate angle position indicated by the angle value depending on the structure of the chassis 12A and 12B or the hinge device 14. Then, in the present embodiment, these shifted angle positions are also referred to as "0-degree position," "180-degree position" and the like, for convenience sake.

In the 0-degree position, the portable information device 10 is in a storage mode. The storage mode is suitable for carrying or storing in a bag etc. since the chassis 12A and 12B are compactly folded and the display 16 is protected inside. In the angle position about between the 120 degrees and 140 degrees, the portable information device 10 is in a laptop mode. In the laptop mode, the portable information device 10 can be used like a typical laptop PC. In the 180-degree position, the portable information device 10 is in a tablet mode. In the tablet mode, the chassis 12A and 12B are formed in one plate shape, and a large-screen display 16 formed in a planar shape can be used.

As illustrated in FIG. 1 and FIG. 3, the backbone member 18 is attached to inner surfaces 12Ab and 12Bb of the chassis 12A and 12B. The backbone member 18 is a sheet-like member of an accordion shape. One end portion in the X direction of the backbone member 18 is fixed to the first chassis 12A and the other end portion in the X direction is slidably supported by the second chassis 12B, for example.

The display 16 is a touch panel type liquid crystal display, for example. The display 16 is a flexible display, such as an organic EL having a paper structure with high flexibility, for example. The display 16 seamlessly covers display surfaces of the first chassis 12A and the second chassis 12B and is opened/closed with an opening/closing operation of the chassis 12A and 12B. A reference symbol 20 in FIG. 2 is a bezel member that surrounds an outer peripheral edge portion of a surface 16a of the display 16.

The display 16 is provided over inner surfaces 12Ab and 12Bb of the chassis 12A and 12B. The display 16 is supported with respect to the inner surfaces 12Ab and 12Bb through a first support plate 22A and a second support plate 22B (refer to FIG. 3). As illustrated by the dashed-two dotted line in FIG. 3, the support plates 22A and 22B are each a thin plate member formed into a rectangular shape. The first support plate 22A is fixed to the first chassis 12A. The second support plate 22B is fixed to the second chassis 12B. The display 16 is fixed to top surfaces of the support plates 22A and 22B using a double-sided tape, or the like. In the display 16, a belt-like region overlapping with the hinge devices 14 serves as a bending region 16b. The bending region 16b is not fixed with respect to the support plates 22A and 22B and is in a relatively movable state.

The chassis 12A and 12B contain a substrate 24 mounted with various types of semiconductor chips, a battery device 25, an antenna device 26, as well as various types of electronic components, and a cooling device etc., for example.

Figure 4A:
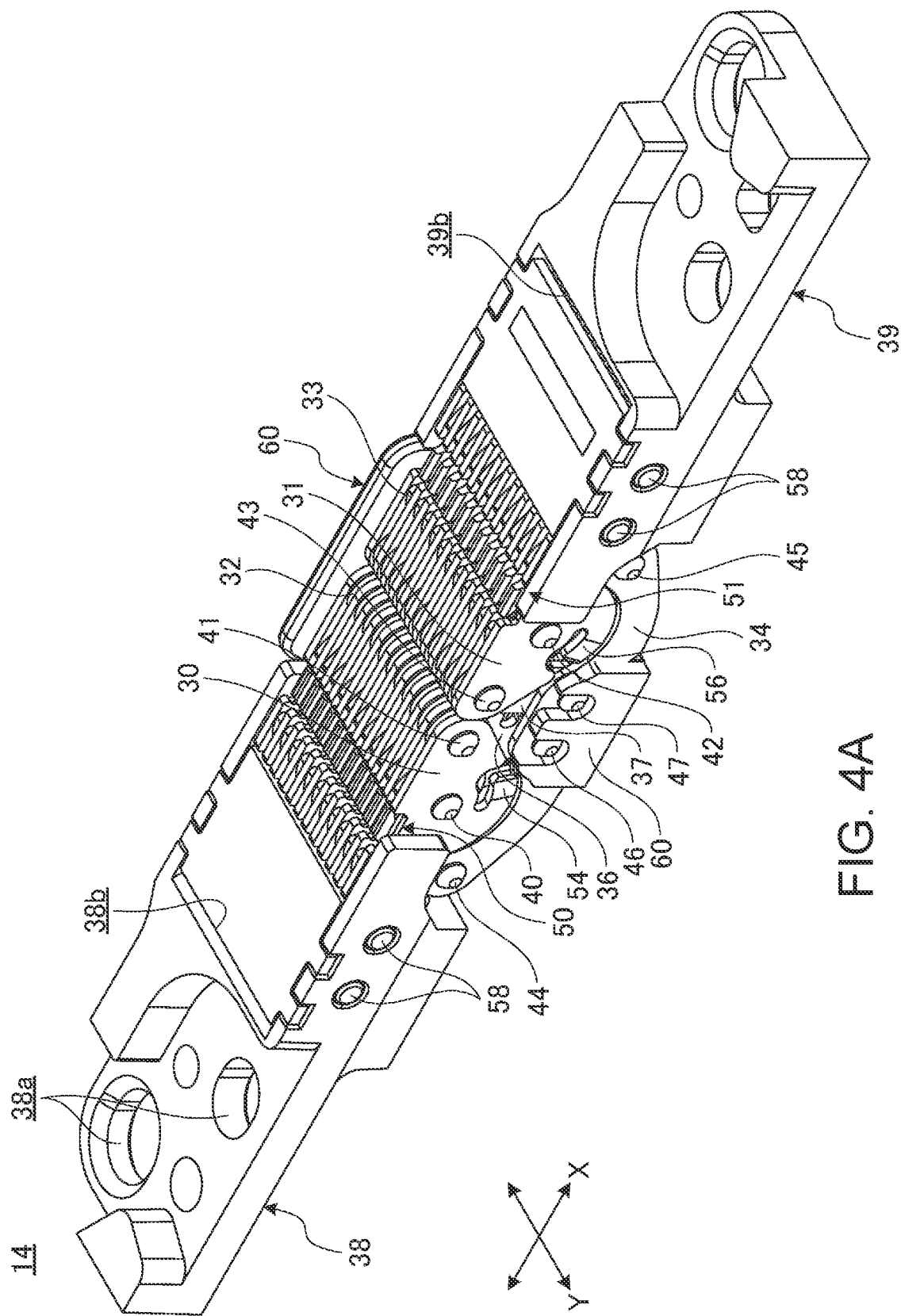
FIG. 4A is a perspective view of the hinge device.
Figure 4B:
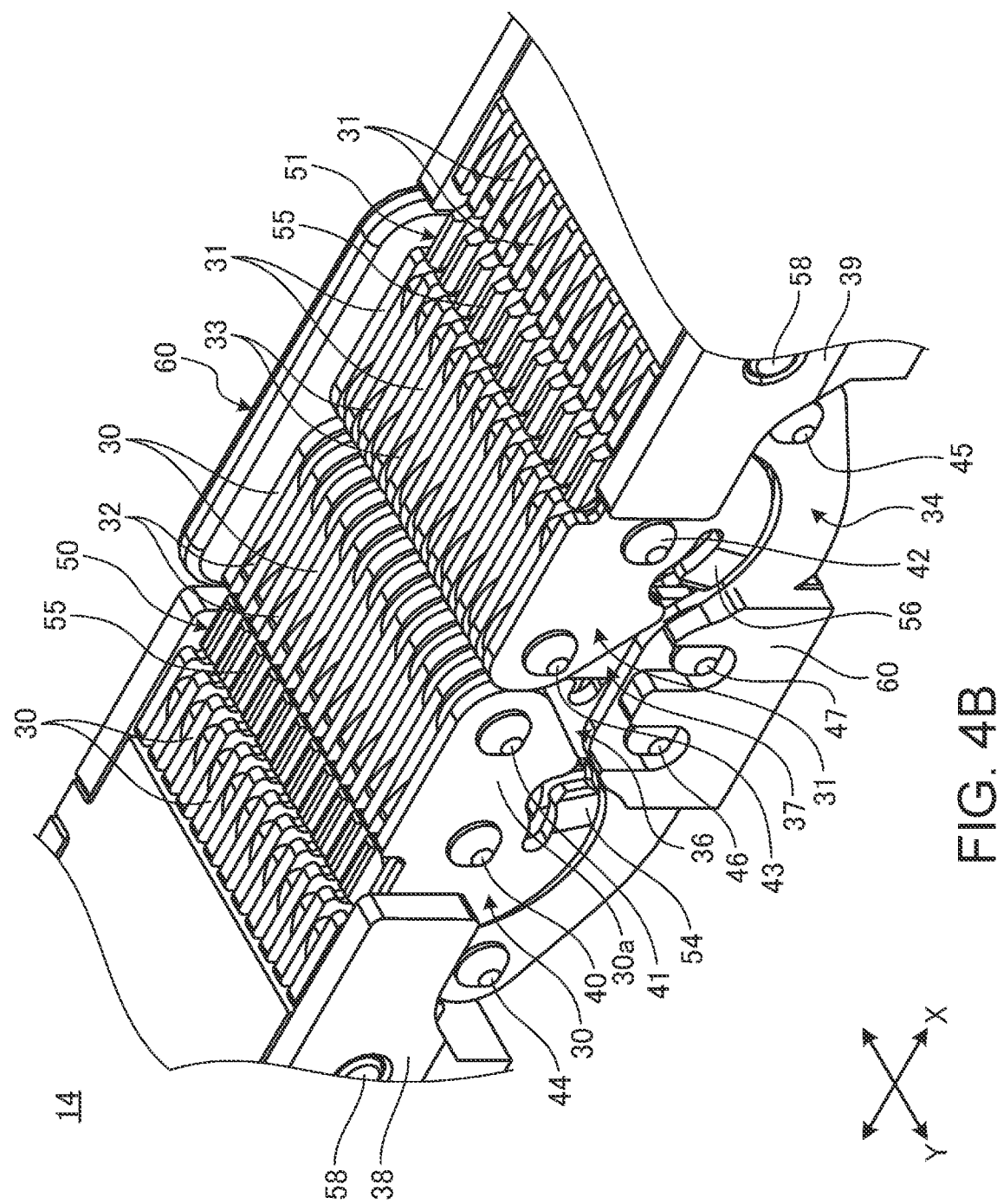
FIG. 4B is a perspective view enlarging a part of the hinge device illustrated in FIG. 4A.
Figure 5:
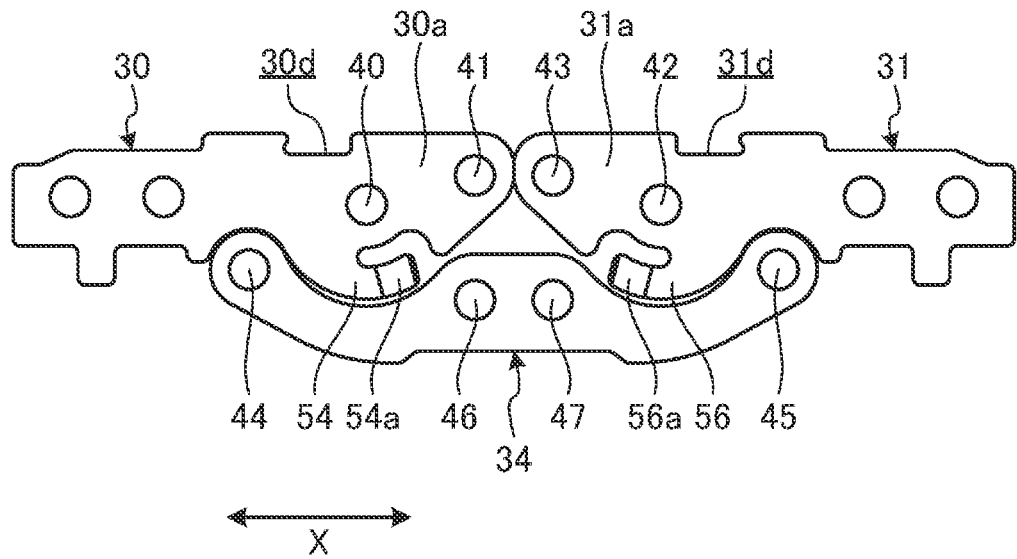
FIG. 5 is a side view enlarging base plates and a coupling plate of elements constituting the hinge device.
Figure 6:
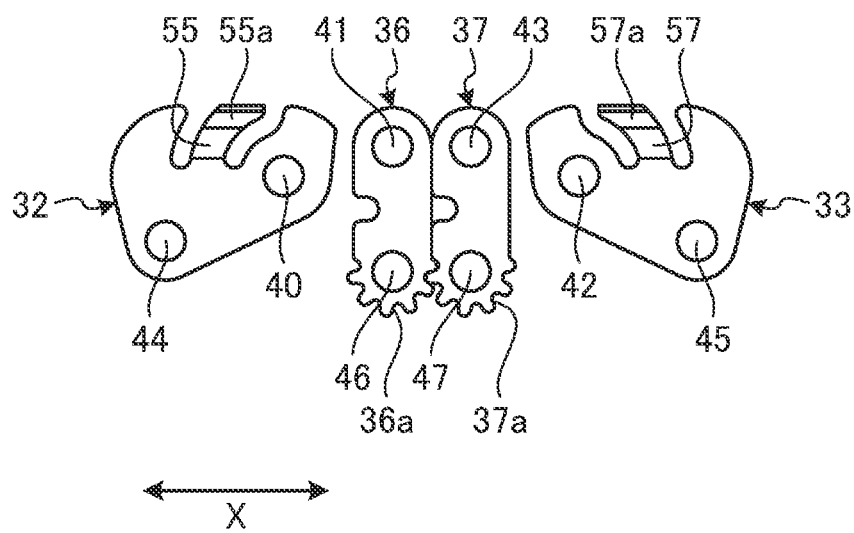
FIG. 6 is a side view enlarging link plates and gear arms of the elements constituting the hinge device.

Next, a specific example of the configuration of the hinge device 14 is described. FIG. 4A is a perspective view of the hinge device 14. FIG. 4B is a perspective view enlarging a part of the hinge device 14 illustrated in FIG. 4A. FIG. 5 is a side view enlarging base plates 30, 31 and a coupling plate 34 of elements constituting the hinge device 14. FIG. 6 is a side view enlarging link plates 32, 33 and gear arms 36, 37 of the elements constituting the hinge device 14. FIG. 7A to FIG. 7F are operation views of the hinge device 14 when the chassis 12A and 12B are changed from the 0-degree position to the 180-degree position. FIG. 7A to FIG. 7F illustrate the states of the hinge device 14 when the chassis 12A and 12B are sequentially changed to the 0-degree position, 30-degree position, 90-degree position, 120-degree position, 150-degree position, and 180-degree position.

As illustrated in FIG. 3, the hinge devices 14 are each disposed at a position beside the outer peripheral edge portion of the display 16 and under the bezel member 20. The hinge device 14 according to the present embodiment rotates the chassis 12A and 12B so that the surface 16a of the display 16 can be always moved along a preset opening/closing track.

Figure 7A:
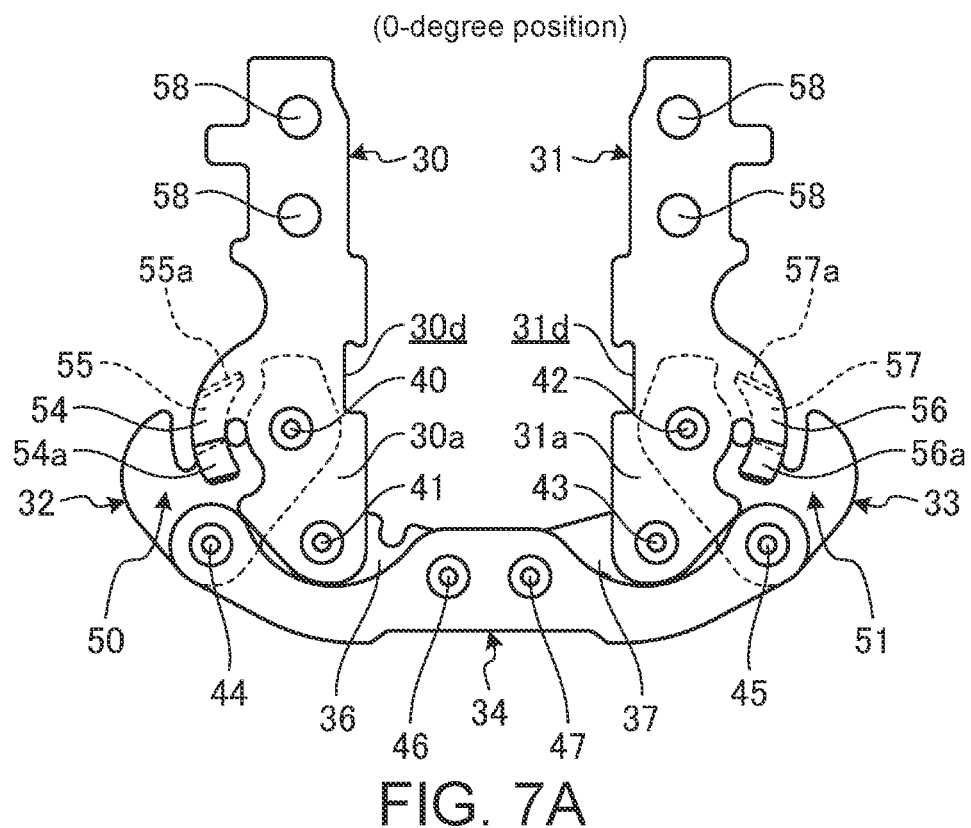
FIG. 7A is a side view illustrating a state of the hinge device when in a 0-degree position.
Figure 7B:
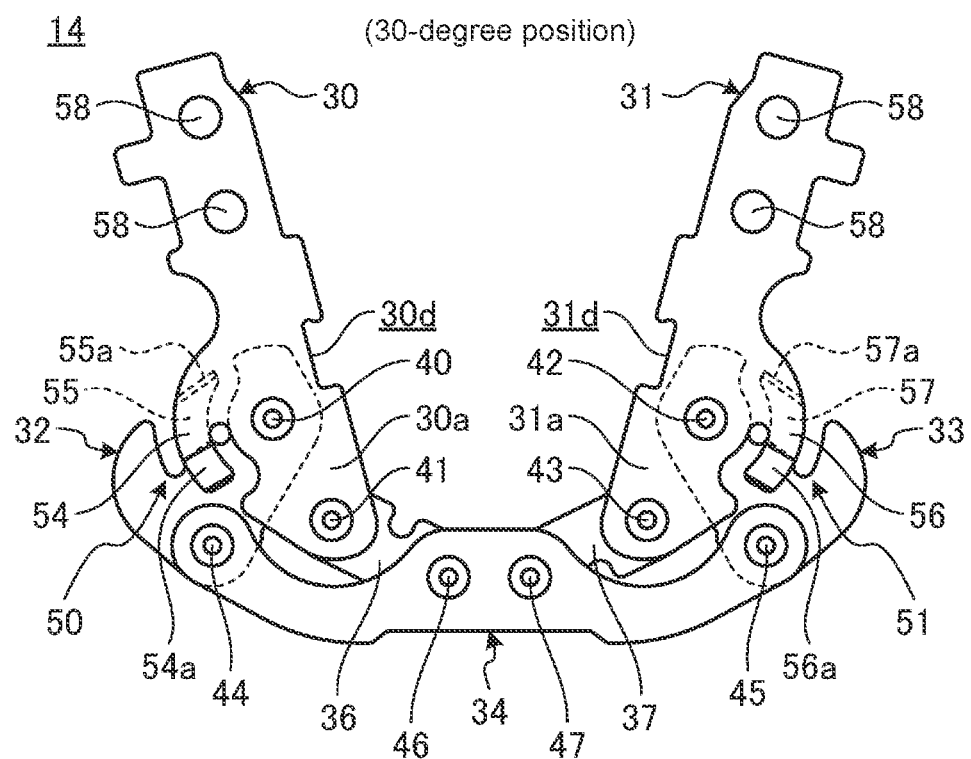
FIG. 7B is a side view illustrating a state of the hinge device when in a 30-degree position.
Figure 7C:
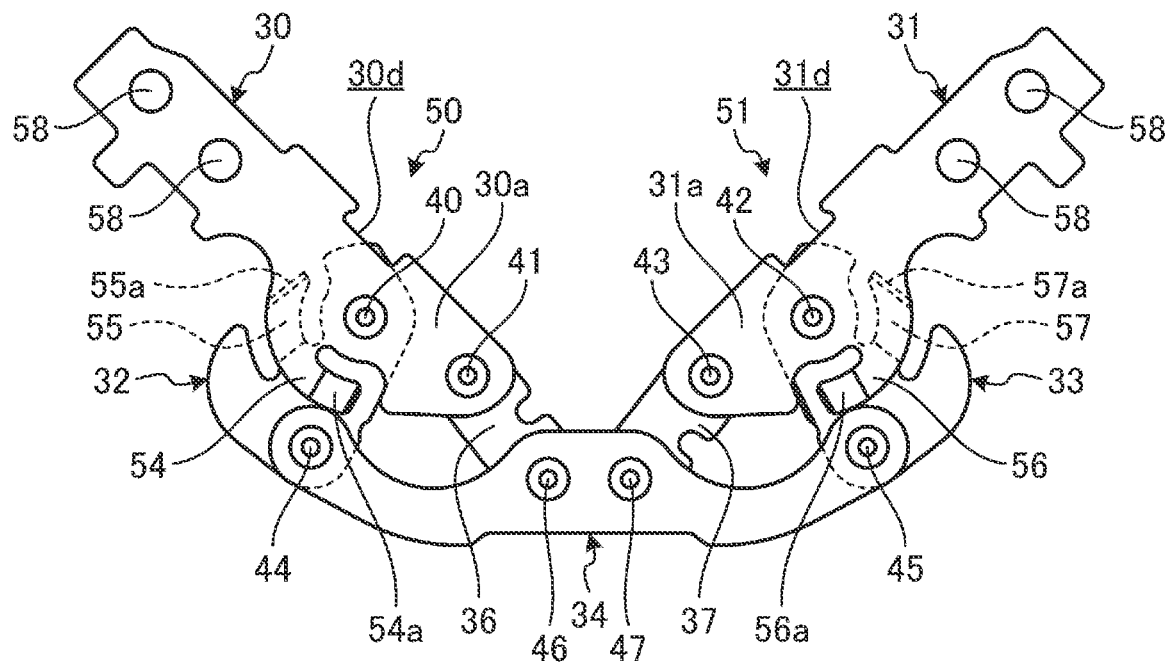
FIG. 7C is a side view illustrating a state of the hinge device when in a 90-degree position.
Figure 7D:
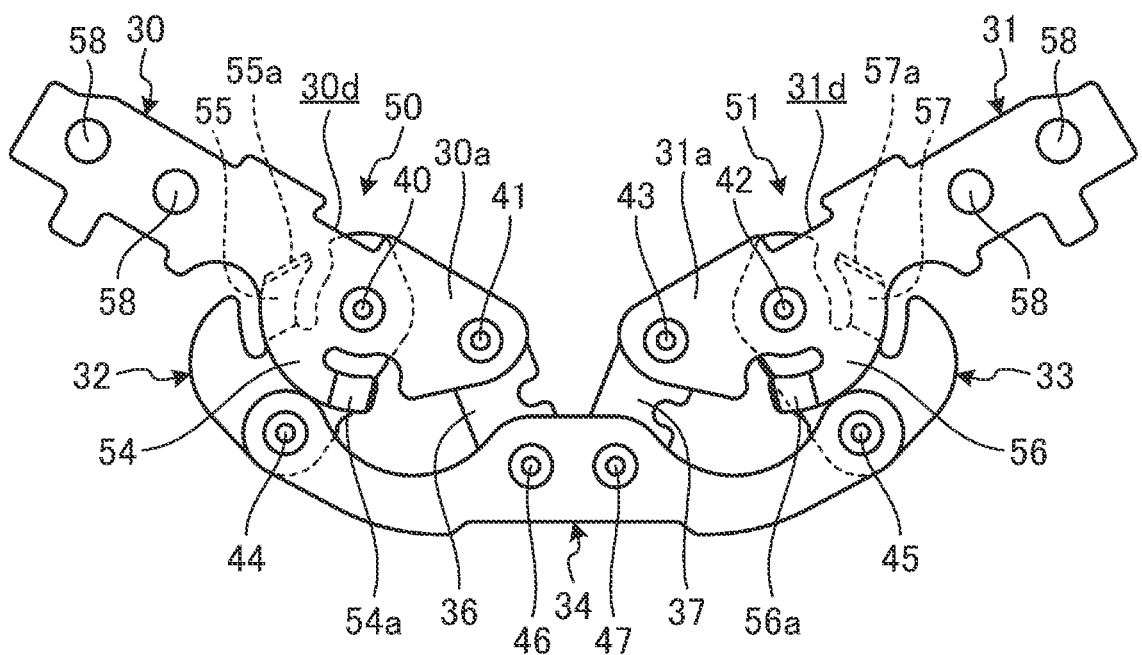
FIG. 7D is a side view illustrating a state of the hinge device when in a 120-degree position.
Figure 7E:
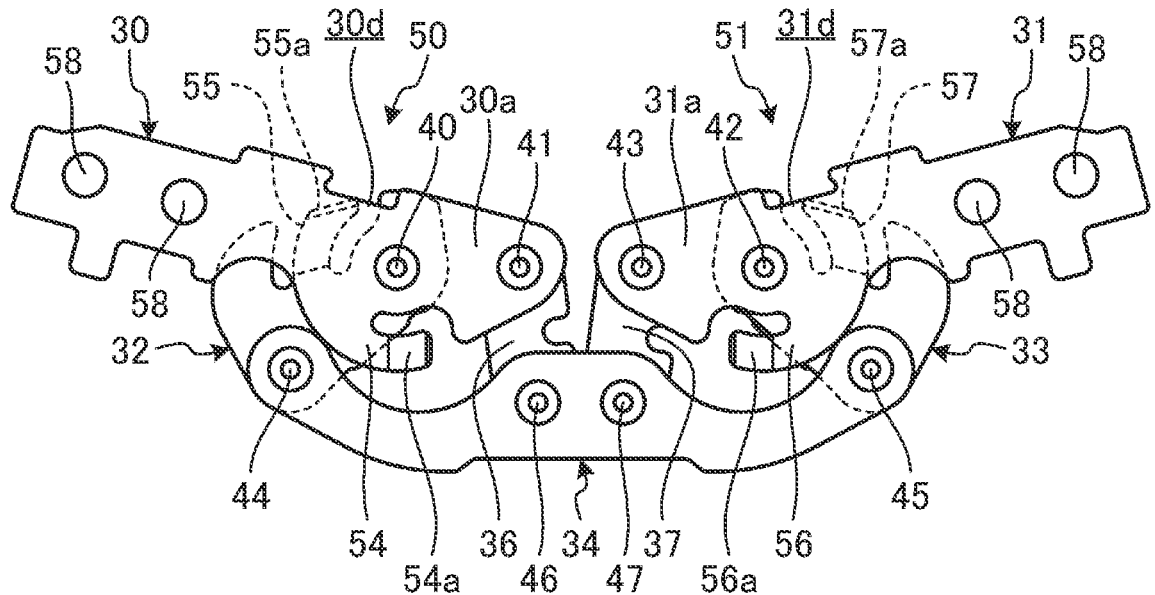
FIG. 7E is a side view illustrating a state of the hinge device when in a 150-degree position.
Figure 7F:
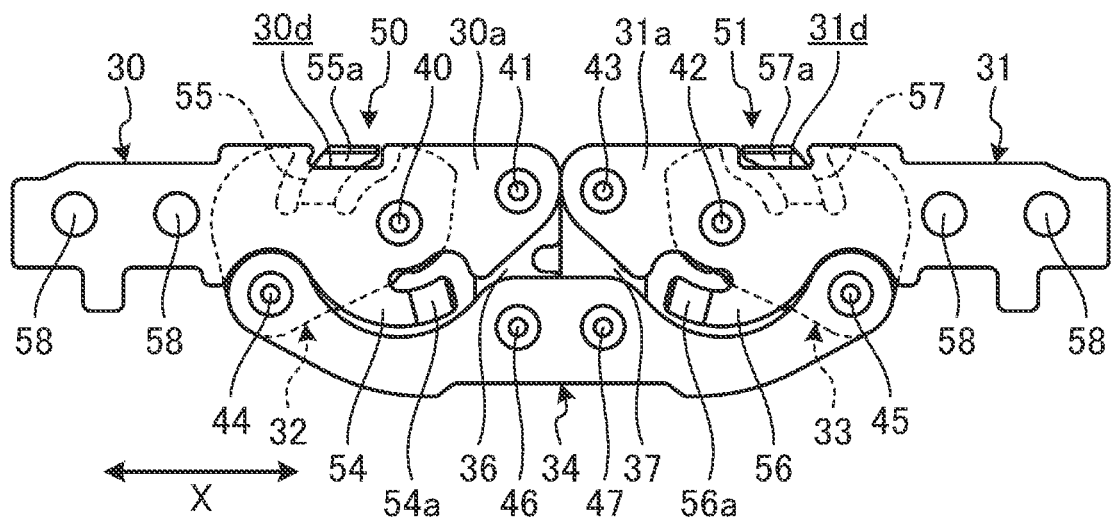
FIG. 7F is a side view illustrating a state of the hinge device when in a 180-degree position.

As illustrated in FIG. 4A, FIG. 4B, and FIG. 7F, the hinge device 14 includes a first base plate 30, a second base plate 31, a first link plate 32, a second link plate 33, a coupling plate 34, a first gear arm 36, and a second gear arm 37. The hinge device 14 further includes a first bracket 38, and a second bracket 39. The hinge device 14 supports these respective elements through shafts 40 to 47 serving as rotation shafts. The hinge device 14 can impart an appropriate weight to the rotational operation between the chassis 12A and 12B and stably hold them in a desired angle position, by the rotation torques to be generated by a first torque generating part 50 and a second torque generating part 51. Hereinafter, unless otherwise explained, a positional relationship between and structure of respective elements are explained on the basis of the arrangement of the hinge device 14 in the 180-degree position illustrated in FIG. 4A, FIG. 4B, and FIG. 7F.

As illustrated in FIG. 3 and FIG. 4A, the first bracket 38 is a bracket for attaching the hinge device 14 to the first chassis 12A and is made of block-shaped metal. The first bracket 38 is screwed to the inner surface 12Ab through a plurality of fastening holes 38a formed at various locations, for example. The second bracket 39 is a bracket for attaching the hinge device 14 to the second chassis 12B and is made of block-shaped metal or resin. The second bracket 39 is screwed to the inner surface 12Bb through a plurality of fastening holes 39a formed at various locations, for example. The brackets 38 and 39 each have recessed portions 38b and 39b, respectively, at end faces facing each other. In the case of the present embodiment, some fastening holes 38a and some fastening holes 39a are used for attaching the support plates 22A and 22B, respectively.

As illustrated in FIG. 4B, FIG. 5 and FIG. 7F, the first base plate 30 is a thin metallic plate. A plurality of the first base plates 30 are provided side by side in a plate thickness direction at an interval equal to a plate thickness of the first link plate 32 or the first gear arm 36. The first link plate 32 and the first gear arm 36 are sandwiched in a slidable state between the adjacent first base plates 30 and 30. One end side of the first base plate 30 is fixed to the first bracket 38 within the recessed portion 38b and the other end side of the first base plate 30 projects outside the recessed portion 38b. The first base plate 30 has a distal end part 30a projecting outside the recessed portion 38b which part has a substantially tapered triangular shape in a side view. A first shaft 40 and a fifth shaft 41 are pivotally supported on the distal end part 30a. The fifth shaft 41 is provided in a tip of the distal end part 30a. The first shaft 40 is provided in a position closer to the first bracket 38 and a little lower than the fifth shaft 41. Shapes of the base plates 30 and 31 can be changed as necessary. The shafts 40 to 47 are each a metallic shaft, for example.

The second base plate 31 has a structure symmetrical to that of the first base plate 30. That is, one end side of the second base plate 31 is fixed to the second bracket 39 within the recessed portion 39b and the other end side of the second base plate 31 projects outside the recessed portion 39b. A plurality of the second base plates 31 are also provided side by side in a plate thickness direction at an interval equal to a plate thickness of the second link plate 33 or the second gear arm 37. The second link plate 33 and the second gear arm 37 are sandwiched in a slidable state between the adjacent second base plates 31 and 31. A second shaft 42 and a seventh shaft 43 are pivotally supported on a distal end part 31a projecting outside the recessed portion 39b of the second base plate 31. The arrangement of each of the shafts 42 and 43 is also symmetrical to that of each of the shafts 40 and 41 in the first base plate 30.

As illustrated in FIG. 4B, FIG. 6 and FIG. 7F, the first link plate 32 is a thin metallic plate. A plurality of the first link plates 32 are provided side by side in a plate thickness direction at an interval equal to a plate thickness of the first base plate 30. The first link plate 32 is a substantially trapezoidal or substantially fork-shaped plate and its vertical width gradually increases from a first end portion on the first shaft 40 side toward a second end portion on the opposite side. Shapes of the link plates 32 and 33 can be changed as necessary. The first link plate 32 is disposed side by side with the first gear arm 36 in the same plane and is sandwiched between the adjacent first base plates 30 and 30. The first end portion of the first link plate 32 on the one edge portion 12Aa side is relatively rotatably connected to the first base plate 30 through the first shaft 40. The second end portion of the first link plate 32 on the opposite side to the first end portion is relatively rotatably connected to the coupling plate 34 through a third shaft 44. That is, the first link plate 32 connects the coupling plate 34 to be movable relatively to the first base plate 30 fixed to the first chassis 12A through the first bracket 38.

The second link plate 33 has a structure symmetrical to that of the first link plate 32. That is, a first end portion of the second link plate 33 is relatively rotatably connected to the second base plate 31 through the second shaft 42 and a second end portion of the second link plate 33 is relatively rotatably connected to the coupling plate 34 through a fourth shaft 45. That is, the second link plate 33 connects the coupling plate 34 to be movable relatively to the second base plate 31 fixed to the second chassis 12B through the second bracket 39. A plurality of the second link plates 33 are also provided side by side in a plate thickness direction at an interval equal to a plate thickness of the second base plate 31.

The coupling plate 34 is a metallic plate connecting the link plates 32 and 33 on the left and right sides. The coupling plate 34 is curved and substantially dish-shaped in a side view. An outer peripheral end surface 34a (bottom end surface in FIG. 7F) of the coupling plate 34 is disposed along the inner surface of the backbone member 18 in the 0-degree position illustrated in FIG. 1. The coupling plate 34 is disposed in the same plane as each of the base plates 30 and 31 and is located under (outside) each of the base plates 30 and 31. A plurality of the coupling plates 34 are provided side by side in a plate thickness direction at an interval equal to a plate thickness of the first link plate 32 or the second link plate 33. A first end portion of the coupling plate 34 is relatively rotatably connected to the first link plate 32 through the third shaft 44. A second end portion of the coupling plate 34 on the opposite side to the first end portion is relatively rotatably connected to the second link plate 33 through the fourth shaft 45. A sixth shaft 46 and an eighth shaft 47 provided side by side on the left and right sides across the bending center C, are pivotally supported on the center portion of the coupling plate 34.

As illustrated in FIG. 6, the first gear arm 36 is a metallic plate. The first gear arm 36 is substantially glasses-shaped in a side view. The first gear arm 36 extends vertically along an end surface of the one edge portion 12Aa of the first chassis 12A. The first gear arm 36 is disposed side by side with the first link plate 32 in the same plane and is sandwiched in a slidable state between the adjacent first base plates 30 and 30. The first gear arm 36 is located closer to the one edge portion 12Aa side than the first link plate 32. A plurality of the first gear arms 36 are provided side by side in a plate thickness direction at an interval equal to a plate thickness of the first base plate 30. A top end portion of the first gear arm 36 is relatively rotatably connected to the first base plate 30 through the fifth shaft 41. A bottom end portion of the first gear arm 36 is relatively rotatably connected to the coupling plate 34 through the sixth shaft 46. The first gear arm 36 has a first gear 36a on a circumferential end surface formed around the sixth shaft 46.

The second gear arm 37 has a structure symmetrical to that of the first gear arm 36. That is, a top end portion of the second gear arm 37 is relatively rotatably connected to the second base plate 31 through the seventh shaft 43, and a bottom end portion of the second gear arm 37 is relatively rotatably connected to the coupling plate 34 through the eighth shaft 47. A plurality of the second gear arms 37 are provided side by side in a plate thickness direction at an interval equal to a plate thickness of the second base plate 31. The second gear arm 37 has a second gear 37a on a circumferential end surface formed around the eighth shaft 47. The second gear 37a engages with the first gear 36a.

The first gear arm 36 and the second gear arm 37 synchronously rotate under the engaging action of each of the gears 36a and 37a. That is, when the first gear arm 36 rotates in the clockwise direction around the sixth shaft 46 as an axis of rotation from the state illustrated in FIG. 7A, for example, the second gear arm 37 rotates in the counter-clockwise direction around the eighth shaft 47 as an axis of rotation, and thus both rotation operations are synchronized. Thus, the first gear arm 36 and the second gear arm 37 form a mechanism which synchronizes operations of each element (the first base plate 30 or the first link plate 32) of the hinge device 14 on the first chassis 12A side and each element (the second base plate 31 or the second link plate 33) of the hinge device 14 on the second chassis 12B side.

Thus, the hinge device 14 has a laminated structure in which a plurality of the first base plates 30 and the left halves of the coupling plates 34 are arranged side by side and the first link plates 32 and the first gear arms 36 are sandwiched between them, on the first chassis 12A side. The hinge device 14 has a laminated structure in which a plurality of the second base plates 31 and the right halves of the coupling plates 34 are arranged side by side and the second link plates 33 and the second gear arms 37 are sandwiched between them, on the second chassis 12B side. Then, the shafts 40 to 47 each penetrate through these laminated base plates 30 and 31, link plates 32 and 33, coupling plates 34, and gear arms 36 and 37 in a laminated direction and support them. In addition, it is a matter of course that shapes of the respective elements of the hinge device 14, that is, the base plates 30 and 31, the link plates 32 and 33, the coupling plate 34, the gear arms 36 and 37, and the brackets 38 and 39 may be changed as necessary.

Next, the torque generating parts 50 and 51 are described. As illustrated in FIG. 4A and FIG. 4B, the torque generating parts 50 and 51 generate rotation torques by frictional resistance due to sliding between the base plates 30, 31 and the link plates 32, 33.

As illustrated in FIG. 5 and FIG. 6, the first base plate 30 has a first base arm 54, and the first link plate 32 has a first link arm 55. The first torque generating part 50 generates a rotation torque by using sliding resistance between the plates 30 and 32 and sliding resistance by the arms 54 and 55 thrusting between the plates 30 and 32. Similarly, the second base plate 31 has a second base arm 56, and the second link plate 33 has a second link arm 57. The second torque generating part 51 generates a rotation torque by using sliding resistance between the plates 31 and 33 and sliding resistance by the arms 56 and 57 thrusting between the plates 31 and 33. Then, the torque generating part 50 (51) generates a torque with a desired characteristic corresponding to the rotation angle between the chassis 12A and 12B by adjustment of the torque generated by the arms 54 and 55 (56 and 57) (refer to FIG. 9).

Hereinafter, the first torque generating part 50 is representatively described since the torque generating parts 50 and 51 have the same basic structure except for being symmetrical to each other, and thus a detailed description of the second torque generating part 51 is omitted with the same reference symbols as the first torque generating part 50 given.

Figure 8:
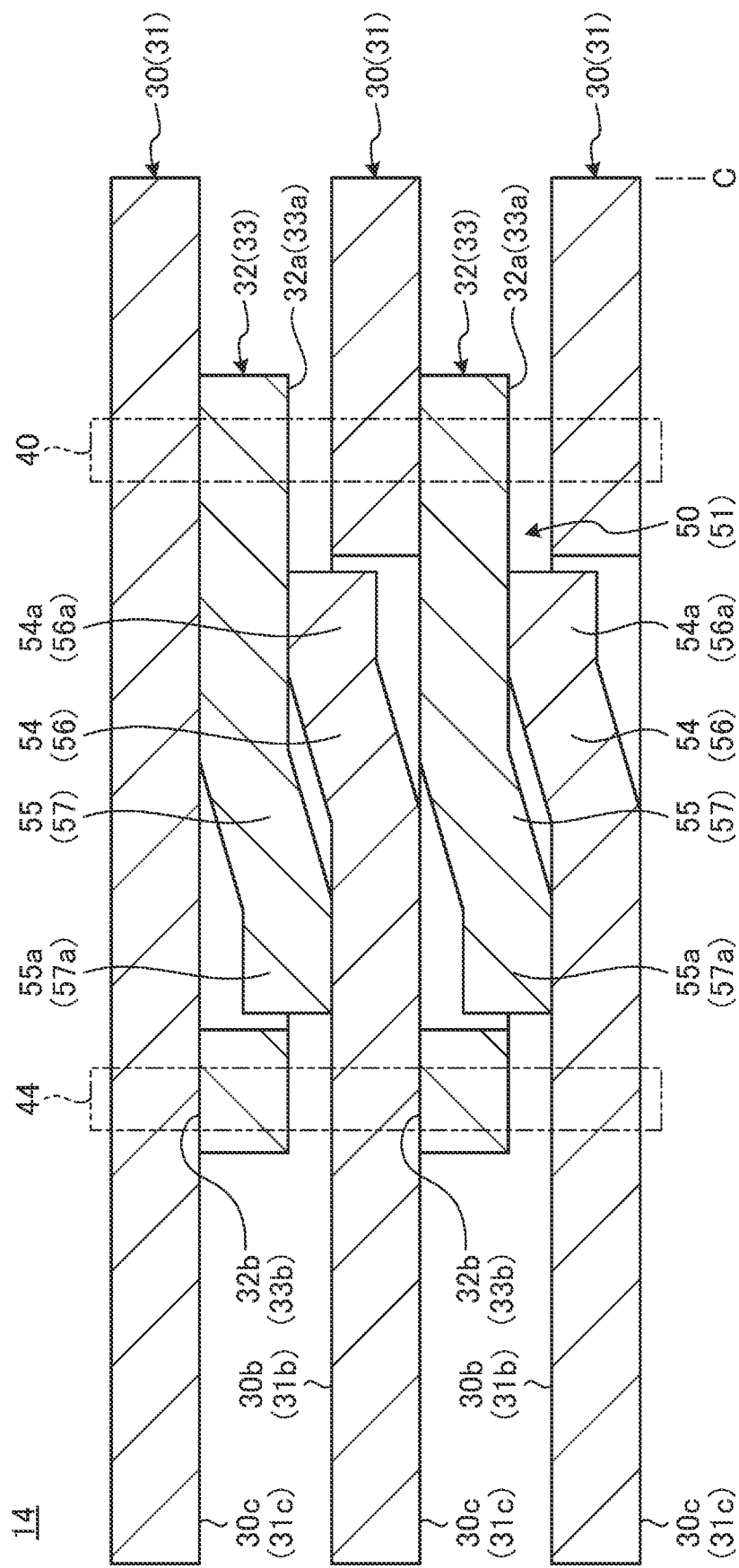
FIG. 8 is a plan cross-sectional view schematically illustrating a configuration of torque generation by base arms and link arms.

FIG. 8 is a plan cross-sectional view schematically illustrating a configuration of the torque generation by the base arm 54 (56) and the link arm 55 (57).

As illustrated in FIG. 5, the first base arm 54 is formed in a bottom end surface of the distal end part 30a of the first base plate 30. The first base arm 54 is a plate spring that is formed into a peninsula shape by a bay-shaped notch portion formed in the first base plate 30, and projects in the X direction toward the bending center C. As illustrated in FIG. 8, the first base arm 54 projects in an elastically deformable state while bending toward the adjacent first link plate 32. Thus, a sliding portion 54a at a tip of the first base arm 54 is in slidable contact with a side surface 32a of the adjacent first link plate 32 and presses the side surface 32a.

The second base arm 56 has a structure symmetrical to that of the first base arm 54. That is, a sliding portion 56a at a tip of the second base arm 56 is in slidable contact with a side surface 33a of the adjacent second link plate 33 and presses the side surface 33a. Locations of the base arms 54 and 56 may be changed.

As illustrated in FIG. 6, the first link arm 55 is formed in a top end surface of the first link plate 32. The first link arm 55 is a plate spring that is sandwiched between a pair of right and left bay-shaped notch portions formed in the first link plate 32 to be formed into a peninsula shape, and projects upward. As illustrated in FIG. 8, the first link arm 55 projects in an elastically deformable state while bending toward the adjacent first base plate 30. Thus, a sliding portion 55a at a tip of the first link arm 55 is in slidable contact with a side surface 30b of the adjacent first base plate 30 and presses the side surface 30b.

The second link arm 57 has a structure symmetrical to that of the first link arm 55. That is, a sliding portion 57a at a tip of the second link arm 57 is in slidable contact with a side surface 31b of the adjacent second base plate 31 and presses the side surface 31b. Locations of the link arms 55 and 57 may be changed.

As illustrated in FIG. 8, the sliding portion 54a of the first base arm 54 and the sliding portion 55a of the first link arm 55 are located between the facing side surfaces 30b and 32a between the plates 30 and 32. The same arrangement applies to the case of the second base arm 56 and the second link arm 57. Thus, the hinge device 14 of the present embodiment is so configured that the side surface 30c (31c) of the middle base plate 30 (31) in FIG. 8 and the side surface 32b (33b) of the lower link plate 32 (33) in the same drawing, for example, are in slidable contact with each other and thus the arms 54 and 55 etc. cannot be provided. These side surfaces 30c (31c) and 32b (33b) may also be provided with the arms 54 (56) and 55 (57). That is, the first base plate 30 and the first link plate 32 may each be provided with a pair of projecting arms 54 and 55 at both side surfaces.

In addition, the lower first link plate 32 in FIG. 8, for example, may be so configured that the first link arm 55 is provided to project not from the side surface 32a but from the side surface 32b on the reverse side, and the sliding portion 55a is made contact with the side surface 30c of the first base plate 30 on the side surface 32b side. However, when the arms 54 and 55 are provided between the facing side surfaces 30b and 32a of the plates 30 and 32 facing each other as illustrated in FIG. 8, the lamination of the plates 30 and 32 is well-balanced and biasing action by the arms 54 and 55 is also stabilized.

A reference symbol 58 in FIG. 4A and FIG. 4B denotes a press-in pin that fixes the base plates 30 and 31 to the brackets 38 and 39. A reference symbol 60 in FIG. 4A and FIG. 4B denotes a cover member that is installed to stride over the hinge device 14 in the Y direction and stands up along a side surface of the hinge device 14. The cover member 60 may be omitted.

Next, with reference to FIG. 7A to FIG. 7F, an operation of rotating the portable information device 10 from the 0-degree position to the 180-degree position and characteristics of the rotation torque at each rotation angle are described.

Figure 9:
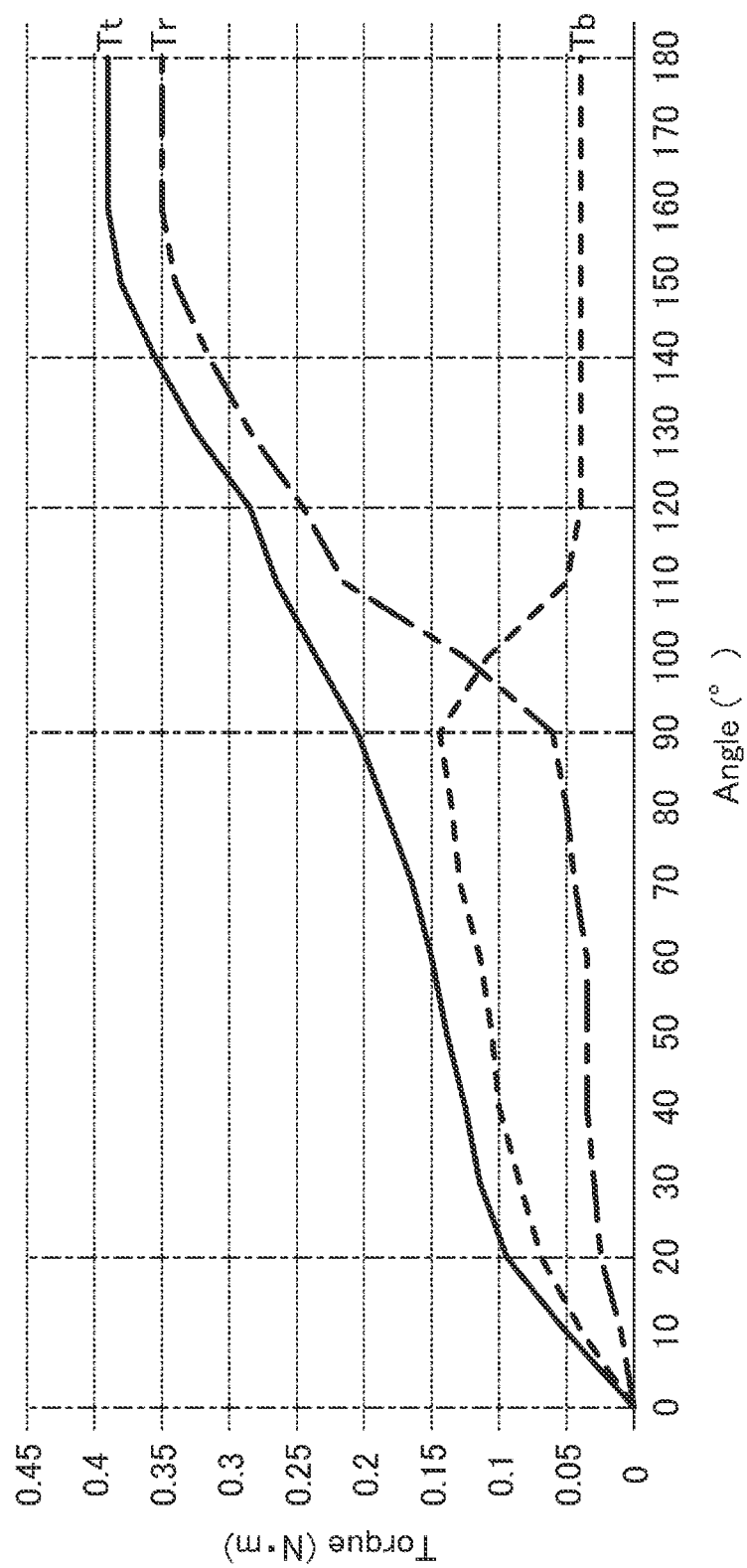
FIG. 9 is a graph that shows a relationship between a rotation angle between the chassis and a value of a rotation torque to be generated by a first torque generating part at each angle.

FIG. 9 is a graph that shows a relationship between a rotation angle (°) between the chassis 12A and 12B and a value (N·m) of a rotation torque generated by the first torque generating part 50 at each angle. In FIG. 9, a graph Tb shown by a dashed line represents a change in a torque Tb that is generated by sliding of the sliding portion 54a of the first base arm 54 along the first link plate 32. A graph Tr shown by a dashed-dotted line represents a change in a torque Tr that is generated by sliding of the sliding portion 55a of the first link arm 55 along the first base plate 30. A graph Tt shown by a solid line represents a torque Tt that is the sum of the torques generated by the respective sliding portions 54a and 55a.

That is, the graph Tt in FIG. 9 represents characteristics of the torque generated by the sliding portions 54a and 55a in the first torque generating part 50 at each rotation angle, and represents a characteristic that the torque changes according to the rotation angle. On the other hand, change in the rotation torque that is generated by the direct sliding between the plates 30 and 32, i.e., the torque due to the sliding resistance between the side surface 30c of the first base plate 30 and the side surface 32b of the first link plate 32 in FIG. 8, according to the rotation angle, is very small compared to that illustrated in FIG. 9, and thus there is no problem if it is treated as a constant value that does not substantially change. Then, in the hinge device 14 of the present embodiment, the change in the torque generated by the first torque generating part 50 according to the rotation angle is adjusted by the operation of the sliding portions 54a and 55a. It is to be noted that torque characteristics for the sliding portions 56a and 57a of the second torque generating part 51 are the same as or similar to the graphs in FIG. 9.

Specifically, the change in the torque Tb in FIG. 9 is formed because a distance (sliding distance) by which the sliding portion 54a (56a) of the base arm 54 (56) slides along the corresponding link plate 32 (33) per unit angle (for example, 1 degree) of the rotational operation between the chassis 12A and 12B, for example, is different at every rotation angle. That is, the sliding distance per unit angle (for example, per 1 degree) of the sliding portion 54a (56a) at 80 degrees is greater than that at 20 degrees. As a result, the torque Tb at 80 degrees is greater than that at 20 degrees. It is to be noted that, in the angle range that is equal to or larger than 90 degrees, the sliding portion 54a (56a) comes out of the external shape of the link plate 32 (33) and the sliding itself decreases, and thus the torque Tb is also reduced (refer to the sliding portions 54a and 56a illustrated in FIG. 7D to FIG. 7F).

Similarly, the change in the torque Tr in FIG. 9 is formed because a distance (sliding distance) by which the sliding portion 55a (57a) of the link arm 55 (57) slides along the corresponding link plate 32 (33) per unit angle, is different at every rotation angle. That is, for the sliding portion 55a (57a), the sliding distance per unit angle, for example, at 0 degrees to 90 degrees, gradually increases and the change is very small, while at 90 degrees or greater, it rapidly increases and the torque Tr also rapidly rises.

Then, for a change in the torque Tt that adjusts the rotation torque generated by the first torque generating part 50, the torque Tb whose magnitude is adjusted by a change in the sliding distance of the sliding portion 54a of the first base arm 54 according to the rotation angle, is also referred to as a first adjusting torque Tb. In addition, the torque Tr whose magnitude is adjusted by a change in the sliding distance of the sliding portion 55a of the first link arm 55 according to the rotation angle, is also referred to as a second adjusting torque Tr. Similarly, for a change in the torque Tt that adjusts the rotation torque generated by the second torque generating part 51, the torque Tb whose magnitude is adjusted by a change in the sliding distance of the sliding portion 56a of the second base arm 56 according to the rotation angle, is also referred to as a third adjusting torque Tb. In addition, the torque Tr whose magnitude is adjusted by a change in the sliding distance of the sliding portion 57a of the second link arm 57 according to the rotation angle, is also referred to as a fourth adjusting torque Tr. Then, an adjusting torque Tt that changes the generated torque of the torque generating part 50 (51) according to the rotation angle, is a total value of the first and second (third and fourth) adjusting torques Tb and Tr at each rotation angle.

Then, described are the operation of the hinge device 14 and the change in the torque generated during the operation. First, when the chassis 12A and 12B are in the 0-degree position as illustrated in FIG. 7A, the base plates 30 and 31 of the hinge device 14 face each other to be parallel, and between them, the bending region 16b that is folded into a substantially U-shape, of the display 16, is disposed. That is, in the state illustrated in FIG. 7A, the coupling plate 34 is disposed so as to support an outer surface of the bending region 16b bent into a U-shape, of the display 16. At this time, the base arm 54 (56) and the link arm 55 (57) are disposed so as to overlap with each other, and the respective sliding portion 54a (56a) and sliding portion 55a (57a) are alternately disposed one above the other.

Next, described are the operation of the hinge device 14 and the change in the torque when the rotation angle between the chassis 12A and 12B is increased from this state. Here, description is made based on the direction illustrated in each drawing, while on the basis of the coupling plate 34 without change in position in the drawings in the operations illustrated in FIG. 7A to FIG. 7F.

From the 0-degree position to the 30-degree position illustrated in FIG. 7B, the first link plate 32 rotates slightly in the counterclockwise direction in the drawing around the third shaft 44 for the coupling plate 34. The first gear arm 36 rotates slightly in the clockwise direction around the sixth shaft 46 for the coupling plate 34. In this regard, the first base plate 30 is connected to the first link plate 32 by the first shaft 40, and connected to the first gear arm 36 by the fifth shaft 41. Thus, the first base plate 30 rotates in the counterclockwise direction while the distal end part 30a moves upward in the drawing. It is to be noted that the operations of the second link plate 33, second gear arm 37, and second base plate 31 are symmetrical to those of the first link plate 32 and the like, and both changes in the torque are the same. Then, hereinafter omitted are descriptions of the operations and actions of the second link plate 33 and second torque generating part 51.

During this operation, the sliding portion 54a of the first base arm 54 and the sliding portion 55a of the first link arm 55 relatively move in directions away from each other. At this time, the operating distance of the first base plate 30 is greater than that of the first link plate 32. Thus, the sliding distance of the sliding portion 54a with respect to the first link plate 32 is greater than that of the sliding portion 55a with respect to the first base plate 30. As a result, from 0 degrees to 30 degrees as illustrated in FIG. 9, the first adjusting torque Tb that is generated by the sliding portion 54a is greater than the second adjusting torque Tr that is generated by the sliding portion 55a, and constitutes most of the torque Tt. In particular, from 0 degrees to 20 degrees, the torque Tb of the sliding portion 54a rapidly rises, and from 0 degrees to 20 degrees, the torque Tt also rapidly increases.

From the 30-degree position to the 90-degree position illustrated in FIG. 7C, an attitude of the first link plate 32 remains virtually unchanged. The first gear arm 36 further rotates in the clockwise direction around the sixth shaft 46. Thus, the first base plate 30 substantially rotates in the counterclockwise direction around the first shaft 40 for the first link plate 32 while the distal end part 30a moves further upward in the drawing.

During this operation, the sliding portion 54a and the sliding portion 55a relatively move in the directions further away. Also at this time, the operating distance of the first base plate 30 is greater than that of the first link plate 32. As a result, between 30 degrees to 90 degrees as illustrated in FIG. 9, the first adjusting torque Tb that is generated by the sliding portion 54a is greater than the second adjusting torque Tr that is generated by the sliding portion 55a, and they both gradually increase at a substantially constant increasing rate. Thus, the total torque Tt also gradually increases at a substantially constant increasing rate.

From the 90-degree position to the 120-degree position illustrated in FIG. 7D, the first link plate 32 rotates in the clockwise direction around the third shaft 44. The first gear arm 36 further rotates in the clockwise direction around the sixth shaft 46. Thus, the first base plate 30 further rotates in the counterclockwise direction.

During this operation, the sliding portion 54a and the sliding portion 55a relatively move in the directions further away. At this time, the sliding distance of the sliding portion 54a of the first base arm 54 rapidly decreases, and at or above 120 degrees, the sliding portion 54a gradually protrudes from the external shape of the corresponding first link plate 32 and the sliding resistance itself rapidly decreases. On the other hand, the sliding distance of the first link arm 55 rapidly increases. As a result, from 90 degrees to 120 degrees as illustrated in FIG. 9, the first adjusting torque Tb that is generated by the sliding portion 54a and the second adjusting torque Tr that is generated by the sliding portion 55a are turned near 100 degrees. Then, the first adjusting torque Tb is kept at a greatly reduced level and substantially constant at 110 degrees or above. On the other hand, the second adjusting torque Tr increases at a rapid increasing rate below 110 degrees, and also gradually increases at 110 degrees or above. Thus, the total torque Tt gradually increases at an increasing rate that is nearly the same as that at 90 degrees or below.

From the 120-degree position to the 150-degree position illustrated in FIG. 7E, the first link plate 32 further rotates in the clockwise direction around the third shaft 44. The first gear arm 36 rotates slightly in the clockwise direction around the sixth shaft 46. Thus, the first base plate 30 substantially rotates in the counterclockwise direction around the fifth shaft 41 for the first gear arm 36.

During this operation, the sliding portion 54a and the sliding portion 55a relatively move in the directions further away. At this time, the sliding portion 54a of the first base arm 54 is maintained in a state of being almost fully removed from the corresponding first link plate 32. On the other hand, the sliding distance of the first link arm 55 gradually increases. As a result, from 120 degrees to 150 degrees as illustrated in FIG. 9, the first adjusting torque Tb that is generated by the sliding portion 54a is kept at a low level and substantially constant. On the other hand, the second adjusting torque Tr gradually increases at the same increasing rate as that from 110 degrees to 120 degrees. Thus, the total torque Tt also gradually increases at an increasing rate that is nearly the same as that at 120 degrees or below.

From the 150-degree position to the 180-degree position illustrated in FIG. 7F, the first link plate 32 further rotates in the clockwise direction around the third shaft 44. The first gear arm 36 rotates slightly in the clockwise direction around the sixth shaft 46 to stand upright. Thus, the first base plate 30 substantially rotates in the counterclockwise direction around the fifth shaft 41 for the first gear arm 36 and its top end surface takes an attitude along the X direction. Thus, the left and right base plates 30 and 31 of the hinge device 14 are disposed along the X direction, and the support plates 22A and 22B and the bezel member 20 can be stably supported on their top end surfaces.

During this operation, the sliding portion 54a and the sliding portion 55a relatively move in the directions further away. At this time, the sliding portion 54a of the first base arm 54 is maintained in the state of being removed from the corresponding first link plate 32. On the other hand, the sliding distance of the first link arm 55 gradually increases. As a result, from 150 degrees to 180 degrees as illustrated in FIG. 9, the first adjusting torque Tb that is generated by the sliding portion 54a is kept at a low level and substantially constant. On the other hand, up to about 160 degrees, the second adjusting torque Tr gradually increases at the same increasing rate as that from 110 degrees to 120 degrees. Thus, the total torque Tt also gradually increases at an increasing rate that is nearly the same as that at 120 degrees or below.

However, near 160 degrees, the sliding portion 55a (57a) of the link arm 55 (57) arrives at a notch portion 30d (31d) that is formed in the top end surface of the base plate 30 (31). Thus, from 160 degrees to 180 degrees, the sliding distance of the sliding portion 55a (57a) increases, but the increase in sliding resistance is suppressed. Thus, at 160 degrees or above, the second adjusting torque Tr remains at a maximum torque and substantially constant, and does not excessively increase (refer to FIG. 9). Thus, in the 180-degree position, the total torque Tt reaches a maximum value.

As described above, in the hinge device 14, the rotation torque that is generated by the torque generating part 50 (51) gradually increases as the position changes from the 0-degree position to the 180-degree position, and the maximum torque is generated at least in the 180-degree position. The hinge device 14 can therefore generate an optimal rotation torque according to the rotation angle between the chassis 12A and 12B, and improve the stability and handleability of the chassis 12A and 12B in each mode.

Specifically, when a torque (first torque) at each rotation angle in the initial operation (for example, 0 degrees to 20 degrees) of starting to use from the storage mode and a torque (second torque) at each rotation angle in the laptop mode (for example, 120 degrees to 140 degrees) are first compared, the second torque is greater in an absolute value while the first torque is greater in an increasing rate. Next, when the second torque in the laptop mode and a torque (third torque) in a tablet mode (180 degrees) are compared, the third torque is greater than the second torque.

Therefore, since as soon as a user begins to open the chassis 12A and 12B from the storage mode in which the torque is minimum, a certain amount of rotation torque rises to give an adequate response to the opening operation of the chassis 12A and 12B, the hinge device 14 is made high quality. On the other hand, the hinge device 14 generates a sufficient rotation torque in the laptop mode. Thus, the portable information device 10 can prevent the occurrence of the situation where the hinge device 14 suddenly opens due to the weight of a chassis (for example, second chassis 12B) standing in the laptop mode and this chassis falls backward.

It is to be noted that even when in the same laptop mode, the effect of the weight of the standing chassis is greater at 140 degrees than at 120 degrees. This is because a distance in which this standing chassis projects backward from the other chassis placed on a desk surface etc. is longer. However, the torque Tr of the hinge device 14 gradually increases in line with the increase in the angle between the chassis 12A and 12B. Thus, the hinge device 14 can more surely prevent the occurrence of failure in use at 140 degrees as described above since the generated torque is greater at 140 degrees than at 120 degrees even when in the same laptop mode.

On the other hand, when in the tablet mode (180 degrees), the hinge device 14 generates the maximum torque. Thus, the occurrence of an erroneous action that the opened chassis 12A and 12B are erroneously closed in the tablet mode, is prevented. At the same time, since the torque Tt is substantially constant from 160 degrees to 180 degrees, the torque Tt when at 180 degrees is not excessively increased and the hinge device is not so tight when the closing operation from this position toward the 0-degree position is performed, which does not deteriorate the handleability.

The hinge device 14 with such torque characteristics may use, for example, a configuration etc. in which protruding portions etc. are each formed on the side surface 30b of the first base plate 30 and the side surface 32a of the first link plate 32 and this protruding portion is slided along the corresponding side surface, as a substitution for the arms 54-57. In addition, the hinge device may not use the plates 30-34 etc. if it can show such torque characteristics. It may use, for example, a configuration etc. in which a shaft as a shaft is formed in a conical shape, this is rotatably pressed into a bearing of a bracket fixed to the chassis 12A and 12B, fastening between both is gradually tightened along with the rotation of the bracket from 0 degrees toward 180 degrees, and a rotation torque increases, as a substitute.

In addition, it is a matter of course that the present invention is not limited to the embodiments described above and can be freely altered without deviating from the scope of the present invention.

In the above, the configuration in which the base plates 30 and 31 are fixed to the chassis 12A and 12B with the brackets 38 and 39, is illustrated by an example. However, the base plates 30 and 31 may be directly fixed to the chassis 12A and 12B without the brackets 38 and 39. It is to be noted that using the brackets 38 and 39 improves the attachability of the hinge device 14 to the chassis 12A and 12B and the manufacturing efficiency.

Although the portable information device 10 foldable into a double-folded state like a book is illustrated by an example in the above, the present invention can be applied to various configurations, such as a hinged double door configuration of foldably connecting respective small chassis members to right and left edge portions of a large chassis member, an S-type folding configuration of connecting respective chassis members with different folding directions to right and left edge portions of one chassis member, a J-type configuration of foldably connecting a small chassis member to either right or left edge portion of a large chassis member and the like, other than the configuration of folding chassis members of the same shape into a double-folded state, and the number of connected chassis members may be four or more.

DESCRIPTION OF SYMBOLS 10 portable information device
12A first chassis
12B second chassis
14 hinge device
16 display
30 first base plate
31 second base plate
32 first link plate
33 second link plate
34 coupling plate
40 first shaft
41 fifth shaft
42 second shaft
43 seventh shaft
44 third shaft
45 fourth shaft
46 sixth shaft
47 eighth shaft
50 first torque generating part
51 second torque generating part
54 first base arm
55 first link arm
56 second base arm
57 second link arm Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A portable information device, comprising:
a first chassis;
a second chassis adjacent to the first chassis;
a hinge device that relatively rotatably connects the first chassis and the second chassis, while gradually changing a relative angle between their plane directions between a 0-degree position in which the first chassis and the second chassis are stacked to overlap with one another in their plane directions and a 180-degree position in which the first chassis and the second chassis are arranged in a direction perpendicular to their plane directions; wherein
the hinge device comprises:
 a first base plate fixed to the first chassis;
 a second base plate fixed to the second chassis;
 a first link plate that overlaps with the first base plate, where a first end portion of the first link plate is relatively rotatably connected to the first base plate through a first shaft;
 a second link plate that overlaps with the second base plate, where a first end portion of the second link plate is relatively rotatably connected to the second base plate through a second shaft;
 a coupling plate having:
  a first end portion of the coupling plate relatively rotatably connected to a second end portion of the first link plate through a third shaft; and
  a second end portion of the coupling plate relatively rotatably connected to a second end portion of the second link plate through a fourth shaft;
 a first torque generating part that generates a rotation torque in relative rotation of the first base plate and the first link plate by sliding resistance between the first base plate and the first link plate; and
 a second torque generating part that generates a rotation torque in relative rotation of the second base plate and the second link plate by sliding resistance between the second base plate and the second link plate,
when the rotation angle between the first chassis and the second chassis is between the 0-degree position and a 20-degree position, torques generated by the first torque generating part and the second torque generating part are a first torque,
when the rotation angle between the first chassis and the second chassis is between a 120-degree position and a 140-degree position, the torques generated by the first torque generating part and the second torque generating part are a second torque,
when the rotation angle between the first chassis and the second chassis is the 180-degree position, the torques generated by the first torque generating part and the second torque generating part are a third torque, and
the second torque is greater than the first torque and the third torque is greater than the second torque.

2. The portable information device according to claim 1, wherein the first base plate has a first base arm projecting in an elastically deformable state toward the first link plate and is in slidable contact with the first link plate, the first link plate has a first link arm projecting in an elastically deformable state toward the first base plate and is in slidable contact with the first base plate, the second base plate has a second base arm projecting in an elastically deformable state toward the second link plate and is in slidable contact with the second link plate, and the second link plate has a second link arm projecting in an elastically deformable state toward the second base plate and is in slidable contact with the second base plate.

3. The portable information device according to claim 2, wherein the first torque generating part generates the first torque, second torque, and third torque, by the change, according to the rotation angle, in a sliding distance of the first base arm with respect to the first link plate and a sliding distance of the first link arm with respect to the first base plate, per unit angle when the first chassis and the second chassis rotate, and the second torque generating part generates the first torque, second torque, and third torque, by the change, according to the rotation angle, in a sliding distance of the second base arm with respect to the second link plate and a sliding distance of the second link arm with respect to the second base plate, per the unit angle.

4. The portable information device according to claim 3, wherein a torque whose magnitude is adjusted by the change, according to the rotation angle, in the sliding distance of the first base arm per the unit angle, is a first adjusting torque, a torque whose magnitude is adjusted by the change, according to the rotation angle, in the sliding distance of the first link arm per the unit angle, is a second adjusting torque, a torque whose magnitude is adjusted by the change, according to the rotation angle, in the sliding distance of the second base arm per the unit angle, is a third adjusting torque, and a torque whose magnitude is adjusted by the change, according to the rotation angle, in the sliding distance of the second link arm per the unit angle, is a fourth adjusting torque, the torque generated by the first torque generating part, by the change in the sliding distance of the first base arm per the unit angle, is set by a total value of the first and second adjusting torques, and the torque generated by the second torque generating part, by the change in the sliding distance of the second base arm per the unit angle, is set by a total value of the third and fourth adjusting torques.

5. The portable information device according to claim 4, wherein the first adjusting torque is smaller than the second adjusting torque when the rotation angle is at least between the 0-degree position and the 20-degree position, while the first adjusting torque is greater than the second adjusting torque when the rotation angle is at least between the 120-degree position and the 180-degree position, and the third adjusting torque is smaller than the fourth adjusting torque when the rotation angle is at least between the 0-degree position and the 20-degree position, while the third adjusting torque is greater than the fourth adjusting torque when the rotation angle is at least between the 120-degree position and the 180-degree position.

6. The portable information device according to claim 1, wherein the hinge device further comprises:

a first gear arm that includes:
a first end portion of the first gear arm that is relatively rotatably connected to the first base plate through a fifth shaft; and
a second end portion of the first gear arm that is relatively rotatably connected to the coupling plate through a sixth shaft,
wherein the first gear arm further includes a first gear around the sixth shaft; and a second gear arm that includes:
a first end portion of the second gear arm that is relatively rotatably connected to the second base plate through a seventh shaft; and
a second end portion of the second gear arm that is rotatably connected to the coupling plate through an eighth shaft,
wherein the second gear arm further includes a second gear engaged with the first gear around the eighth shaft.

7. A portable information device, comprising:
a first chassis;
a second chassis adjacent to the first chassis; and
a hinge device that relatively rotatably connects the first chassis and the second chassis, while gradually changing a relative angle between their plane directions between a 0-degree position in which the first chassis and the second chassis are stacked to overlap with one another in their plane directions and a 180-degree position in which the first chassis and the second chassis are arranged in a direction perpendicular to their plane directions, wherein the hinge device has a torque generating part that generates a rotation torque in a rotation operation between the first chassis and the second chassis, when the rotation angle between the first chassis and the second chassis is between the 0-degree position and a 20-degree position, a torque generated by the torque generating part is a first torque, when the rotation angle between the first chassis and the second chassis is between a 120-degree position and a 140-degree position, the torque generated by the torque generating part is a second torque, when the rotation angle between the first chassis and the second chassis is the 180-degree position, the torque generated by the torque generating part is a third torque, and the second torque is greater than the first torque and the third torque is greater than the second torque.

8. A hinge device that relatively rotatably connects a first chassis and a second chassis of a portable information device while gradually changing a relative angle between their plane directions between a 0-degree position in which the first chassis and the second chassis are stacked to overlap with one another in their plane directions and a 180-degree position in which the first chassis and the second chassis are arranged in a direction perpendicular to their plane directions, the hinge device comprising:

a first base plate fixed to the first chassis;
a second base plate fixed to the second chassis;

a first link plate that overlaps with the first base plate, where a first end portion of the first link plate is relatively rotatably connected to the first base plate through a first shaft;

a second link plate that overlaps with the second base plate, where a first end portion of the second link plate is relatively rotatably connected to the second base plate through a second shaft;

a coupling plate having:
- a first end portion of the coupling plate relatively rotatably connected to a second end portion of the first link plate through a third shaft; and
- a second end portion of the coupling plate relatively rotatably connected to a second end portion of the second link plate through a fourth shaft;

a first torque generating part that generates a rotation torque in relative rotation of the first base plate and the first link plate by sliding resistance between the first base plate and the first link plate; and a second torque generating part that generates a rotation torque in relative rotation of the second base plate and the second link plate by sliding resistance between the second base plate and the second link plate, wherein torques generated by the first torque generating part and the second torque generating part, when the rotation angle between the first chassis and the second chassis is set between the 0-degree position and a 20-degree position, are a first torque, torques generated by the first torque generating part and the second torque generating part, when the rotation angle between the first chassis and the second chassis is set between a 120-degree position and a 140-degree position, are a second torque, torques to be generated by the first torque generating part and the second torque generating part, when the rotation angle between the first chassis and the second chassis is set to the 180-degree position, are a third torque, and the second torque is greater than the first torque and the third torque is greater than the second torque.

* * * * *